United States Patent [19]
Patel et al.

[11] Patent Number: 6,148,002
[45] Date of Patent: *Nov. 14, 2000

[54] SHARED AUTO-NEGOTIATION LOGIC FOR MULTIPLE PORT NETWORK DEVICES

[75] Inventors: Sandeep A. Patel, Cupertino; Claude G. Hayek, Mountain View, both of Calif.

[73] Assignee: 3Com Corporation, Santa Clara, Calif.

[ * ] Notice: This patent is subject to a terminal disclaimer.

[21] Appl. No.: 09/268,862

[22] Filed: Mar. 15, 1999

Related U.S. Application Data

[63] Continuation of application No. 08/774,480, Dec. 30, 1996, Pat. No. 5,883,894.

[51] Int. Cl.[7] ................................................ H04L 12/413
[52] U.S. Cl. .......................... 370/438; 370/447; 370/449; 370/462
[58] Field of Search ...................... 370/438, 465, 370/466, 447, 449, 462, 401, 437, 439, 445, 461

[56] References Cited

U.S. PATENT DOCUMENTS

| | | |
|---|---|---|
| 5,402,421 | 3/1995 | Hayasaka et al. . |
| 5,519,837 | 5/1996 | Tran . |
| 5,586,117 | 12/1996 | Edem et al. ............................. 370/466 |
| 5,617,418 | 4/1997 | Shirani et al. ........................... 370/465 |
| 5,758,109 | 5/1998 | Gafford . |
| 5,883,894 | 3/1999 | Patel et al. .............................. 370/438 |

*Primary Examiner*—Douglas W. Olms
*Assistant Examiner*—R Vanderpuye
*Attorney, Agent, or Firm*—Wilson, Sonsini, Goodrich & Rosati

[57] ABSTRACT

A device interconnects across links, a plurality of terminals having respective modes of operation. The device includes a plurality of ports for connection to respective links, and logic coupled to the plurality of ports to exercise an auto-negotiation protocol with terminals coupled to the respective links to resolve modes of operation. The logic includes a shared unit for executing the auto-negotiation protocol, and an arbiter unit for arbitrating among the plurality of ports for use of the shared unit. The arbiter connects ports in the plurality of ports to the shared unit in a round robin sequence. Memory stores a set of status signals for respective ports. The arbiter logic polls the memory to read the set of status signals in sequence, and in response enables use of the shared auto-negotiation unit by the ports. The modes of operation resolved by the shared auto-negotiation unit include LAN technology supported by terminals on the corresponding links, such as IEEE 802.3 Local Area Network technologies.

15 Claims, 4 Drawing Sheets

SHARED AUTO-NEGOTIATION LOGIC FOR MULTIPLE PORT NETWORK DEVICES

RELATIONSHIP TO COPENDING APPLICATIONS

This application is a Continuation of application Ser. No. 08/774,480, filed Dec. 30, 1996 now U.S. Pat. No. 5,883,894, which application is incorporated herein by reference in its entirety.

BACKGROUND OF THE INVENTION

1. Field of the Invention

Present invention relates to network intermediate devices for interconnecting terminals in a network across communication links; and more particularly to techniques used to resolve modes of operation for the links.

2. Description of Related Art

Communication networks consist of terminals that are interconnected by links to network intermediate devices such as repeaters, switches, bridges and the like. The intermediate devices are used to interconnect the terminals to establish paths of communication among the terminals.

As network technologies have developed, a wide variety of techniques have evolved for operating links between terminals and intermediate devices. For example, the ethernet network standard according to the IEEE Standard 802.3, published by the Institute of Electrical and Electronic Engineers, supports a variety of local area network (LAN) technologies. These technologies include the 10 BASE-T standard which specifies a 10 megabit per second carrier sense multiple access with collision detection (CSMA/CD) LAN over two pairs of twisted pair telephone wire, the 10 BASE-F standard which specifies a 10 megabit per second CSMA/CD LAN over fiber optic cable; the 100 BASE-TX standard specifies a 100 megabit per second CSMA/CD LAN over two pairs of category five UTP or shielded twisted pair wire, and a number of other current and emerging technologies. Typically data terminals in a network are designed to support a specific LAN technology. However, network intermediate devices which are designed to interconnect a wide variety of terminals, need a technique for resolving the particular technology used across a link coupled to a particular port of the device.

To meet this need for resolving the LAN technology of a particular link, the IEEE standards commissions have developed an auto-negotiation function which specifies physical layer signaling for 10 megabit per second and 100 megabit per second LAN technologies which utilize twisted pair wiring. These technologies include 10 BASE-T, 10 BASE-T full duplex, 100 BASE-TX, 100 BASE-TX full duplex, and 100 BASE-T4. The specified auto-negotiation function is designed to support other technologies and new LAN technologies as they evolve. The auto-negotiation function according to the standard allows a device to advertise enhanced modes of operation that it possesses to a device at the remote end of a link, and to detect corresponding enhanced modes of operation that the other device may be advertising. The auto-negotiation function automatically configures both devices to take maximum advantage of their abilities. The auto-negotiation function is performed at the physical layer relying on link integrity test pulse sequences (including normal link pulses NLPs and fast link pulses FLPs), so that no packet or upper layer protocol overhead is added to network devices for the purposes of this function.

The auto-negotiation function is specified in clause 28 of IEEE Standard 802.3u-1995, Institute of Electrical and Electronic Engineers, Inc., pages 235–280, and associated annexes. Clause 28 is incorporated by reference as if fully set forth herein.

The auto-negotiation function is designed for implementation in the physical layer of each port on the network intermediate devices which utilize the standard. See Clause 28, supra, FIG. 28-2 "Location of Auto-Negotiation Function within the ISO Reference Model" on page 237. Thus, a twelve port repeater or other intermediate device, will have twelve instantiations of the auto-negotiation state machine. The auto-negotiation state machine is quite complicated, encompassing thousands of logic gates. Thus, the auto-negotiation function significantly increases the cost of network intermediate devices.

Accordingly, it is desirable to provide an auto-negotiation function for network intermediate systems, with a more efficient architecture, so that expensive space on integrated circuits implementing the ports can be saved.

SUMMARY OF THE INVENTION

According to the present invention a device having an improved auto-negotiation function architecture is provided that interconnects across links, a plurality of terminals having respective modes of operation. The device includes a plurality of ports for connection to respective links, and logic coupled to the plurality of ports to exercise an auto-negotiation protocol with terminals coupled to the respective links to resolve modes of operation. The logic includes a shared unit for executing the auto-negotiation protocol, and an arbiter unit for arbitrating among the plurality of ports for use of the shared unit. In one preferred embodiment, the arbiter includes logic which connects ports in the plurality of ports to the shared unit in a round robin sequence.

According to another aspect of the invention, the device includes memory storing a set of status signals for respective ports. The status signals indicate one of a resolved state and an unresolved state for the corresponding ports. The resolved state indicates that a mode of operation has been resolved for the link on the corresponding port. The unresolved state indicates that the mode of operation has not been resolved for the link on the corresponding port. The arbiter logic polls the memory to read the set of status signals in sequence, and in response enables use of the shared auto-negotiation unit by the ports.

According to another aspect of the invention, the shared auto-negotiation unit generates a signal upon successful resolution of a mode of operation for a corresponding port. Logic is responsive to said signal to write the status signals in the memory.

According to a preferred aspect of the invention, the modes of operation resolved by the shared auto-negotiation unit include LAN technology supported by terminals on the corresponding links. More preferably, the LAN technologies comprise IEEE 802.3 Local Area Network technologies.

According to yet another embodiment, the shared auto-negotiation unit comprises an auto-negotiation function specified according to IEEE Standard 802.3u, clause 28.

The present invention can also be characterized as a method for automatically negotiating a mode of operation for a set of ports on a network device. The method comprises the steps of:

monitoring status of ports in the set of ports according to a sequence to determine whether a mode of operation is resolved or unresolved for selected ports in the sequence;

for a selected port in the sequence, if the status indicates that a mode of operation is unresolved, then connecting the selected port to a shared auto-negotiation unit and executing an auto-negotiation protocol for the selected port to resolve a mode of operation; and changing the status of the selected port from unresolved to resolved, and returning to the step of monitoring.

In accordance with the techniques discussed above, the method of the present invention includes storing status signals for the ports indicating whether the mode of operation is resolved or unresolved, and the status of ports is monitored by polling the stored status signals.

According to another aspect of the invention, the network intermediate device which includes the shared auto-negotiation unit according to the present invention, comprises a repeater. In alternative systems, the intermediate device comprises a switch or a bridge.

According to one embodiment of the present invention, a master state machine is coupled with a shared auto-negotiation state machine to be used by multiple ports in a network device. The master state machine operates at network device power up to connect the auto-negotiation state machine to one port at a time. The master state machine connects the shared auto-negotiation state machine to a next port when auto-negotiation is complete for the current port, or a timer has expired. During normal operation, after the power up sequence is complete, the master state machine checks each port for link status. If the link status is OK for the port being checked, then the master state machine moves to a next port. If the link status is not OK, then the master state machine connects the auto-negotiation state machine to the port, and waits for auto-negotiation to successfully complete, or a timer to expire. This sequence is repeated by the master state machine in a round robin sequence. Once auto-negotiation is complete on a particular port, the link integrity state machine on the port brings the status of the link up. The link status check allows the auto-negotiation state machine to move to the next port, and reduces the overall time required to bring up link status on all ports of the network device.

Accordingly, a shared auto-negotiation state machine is provided for network intermediate devices, based on a realization that in multiple port network devices, it is not necessary that all links be brought up simultaneously or in parallel. Furthermore, the invention is useful in any network device which has multiple ports, such as repeaters, bridges and switches.

In summary, the present invention allows network devices with multiple ports to be implemented with a shared auto-negotiation state machine and a simple master state machine which arbitrates use of the shared unit. This provides substantial cost advantages over the prior art by reducing the complexity of logic required on each port.

Other aspects and advantages of the present invention can be seen upon review of the figures, the detailed description and the claims which follow.

DETAILED DESCRIPTION

Figure 1:
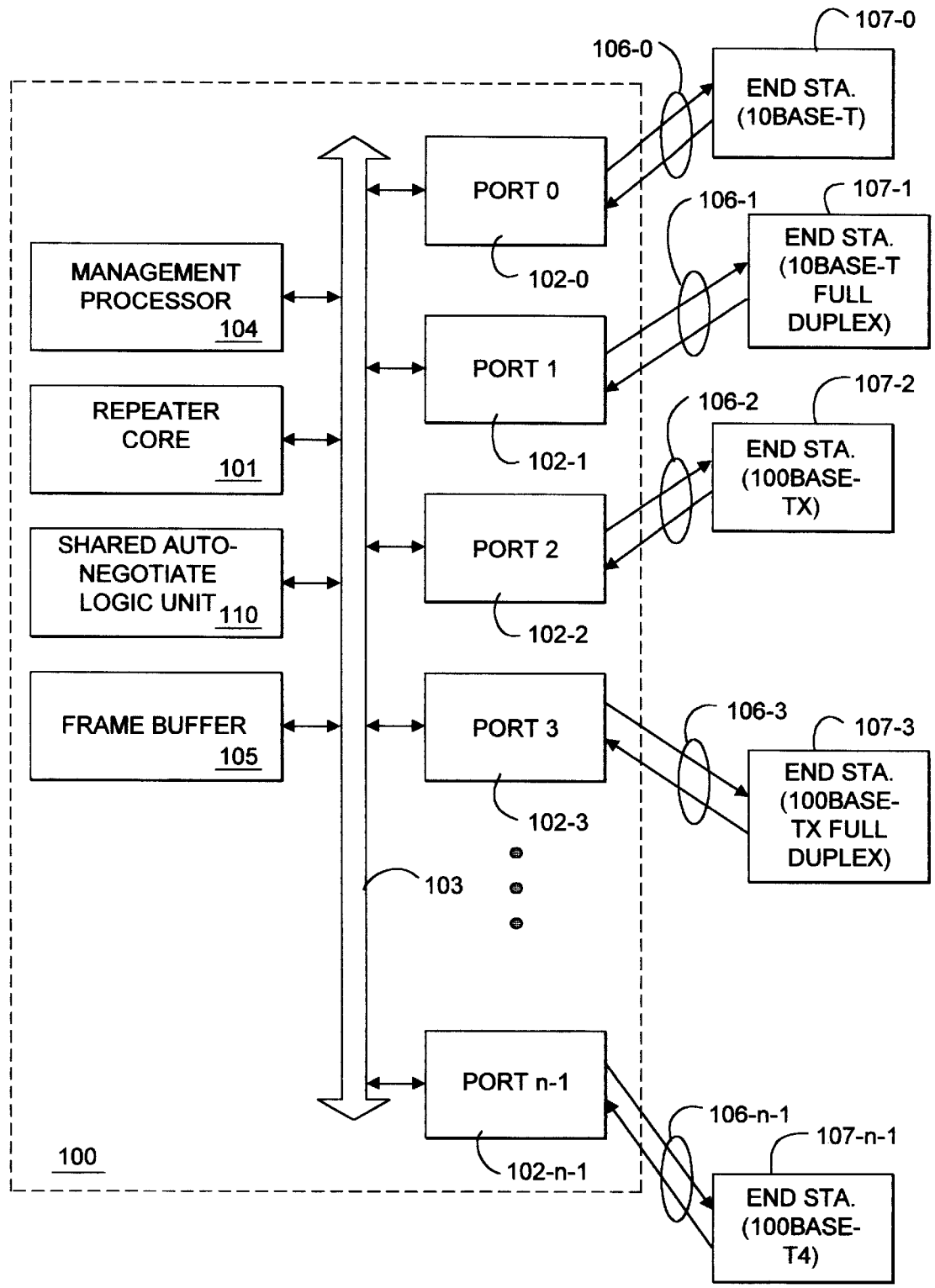
FIG. 1 is a simplified block diagram of a network including an intermediate device with a shared auto-negotiation logic unit according to the present invention.

A detailed description of preferred embodiments of the present invention is provided with respect to FIGS. 1 through 4, in which FIG. 1 illustrates a network intermediate device 100 including a shared auto-negotiation function according to the present invention. In FIG. 1, the network intermediate device 100 comprises a repeater, and includes a repeater core state machine 101 and shared autonegotiate unit 110 according to the present invention. In alternative systems, the network intermediate device 100 consists of a switch or a bridge, or other technology used for interconnecting network terminals.

The device 100 includes a set of ports, including port (0) 102-0 through port (n–1) 102-n–1. The set of ports 102-0 through 102-n–1 is coupled to the repeater core 101 and shared autonegotiate unit 110 across bus 103. In addition, a repeater management processor 104 and optionally a frame buffer 105 are included, and coupled to the bus 103.

In alternative architectures, the set of ports 102-0 through 102-n–1 is coupled directly to the repeater core in a star configuration. Also, other interconnection technologies can be used depending on the particular environment.

Ports in the set of ports 102-0 through 102-n–1 are coupled to respective links 106-0 through 106-n–1. A plurality of end stations 107-0 through 107-n–1 are coupled to the links 106-0 through 106-n–1 respectively. Each of the end stations (or other network terminals) has a respective mode of operation according to the LAN technology supported by the terminal. In the example of FIG. 1, end station 107-0 supports 10 BASE-T technology. End station 107-1 supports 10 BASE-T full duplex technology. End station 107-2 supports 100 BASE-TX technology. End station 107-3 supports 100 BASE-TX full duplex technology. End station 107-n–1 supports 100 BASE-T4 technology.

According to the present invention, rather than implementing an auto-negotiation state machine in each of the ports 102-0 through 102-n–1, a shared auto-negotiation unit 110 is coupled to the set of ports. The shared autonegotiate logic performs the IEEE 802.3u Clause 28 auto-negotiation function in a preferred system, to automatically resolve a mode of operation for each of the ports for the twisted pair wiring based technologies specified according to 802.3 CSMA/CD networks.

Figure 2:
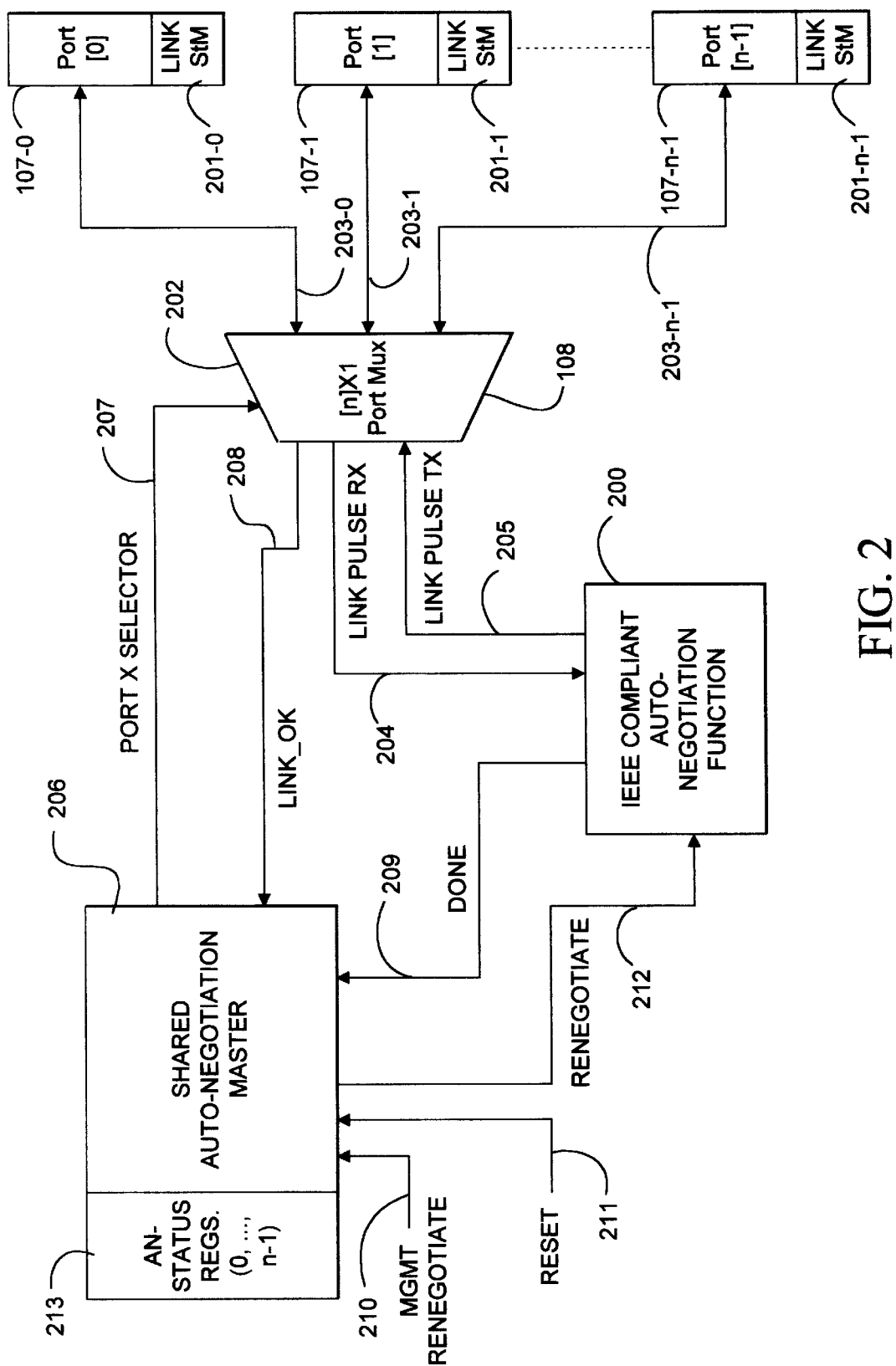
FIG. 2 is a more detailed block diagram of a multiport, shared auto-negotiation device according to the present invention.

Implementation of the shared auto-negotiation unit 110 is illustrated in FIG. 2. In FIG. 2, the architecture is illustrated for an IEEE compliant 802.3 auto-negotiation function. Thus, a shared auto-negotiation function unit 200 is provided. The set of ports 107-0 through 107-n–1 is shown. Coupled with each port is a link state machine 201-0 through 201-n–1. The link pulses received and transmitted through the ports in the set of ports 107-0 through 107-n–1 are coupled to a selector 202 across lines 203-0 through 203-n–1. The selector comprises an n-to-1 port multiplexer which connects the received link pulses from a selected port across line 204 to the shared auto-negotiation function 200, and supplies the link pulses which are transmitted by the auto-negotiation function 200 across line 205 to the selected port. A shared auto-negotiation master state machine 206 generates a PORT X SELECTOR signal on line 207, which controls the selector 202. Link status signals, including the LINK_OK signal from the selected port are supplied on line 208 to the master state machine 206. Also, when the auto-negotiation function 200 completes resolving the mode of operation for a select port, a DONE signal is supplied to the master state machine 206 on line 209. Other inputs to the master state machine 206 include a management renegotiate signal on line 210, and a RESET signal on line 211. The shared autonegotiate master state machine 206 selects a current port, and issues a RENEGOTIATE signal on line 212 to the shared unit 200. After the RENEGOTIATE signal is issued, and the master state machine 206 waits to receive a DONE signal on line 209, or until expiration of the timer as discussed below.

The status signals for the individual ports are stored in the auto-negotiate status registers 213 which are coupled with the master state machine 206 in this example. When the mode of operation for a particular port is successfully resolved, then the master state machine writes a resolved status to the corresponding status register. When, the status register stores a status signal indicating an unresolved state, the master state machine 206 periodically retries to resolve a mode of operation.

Figure 3:
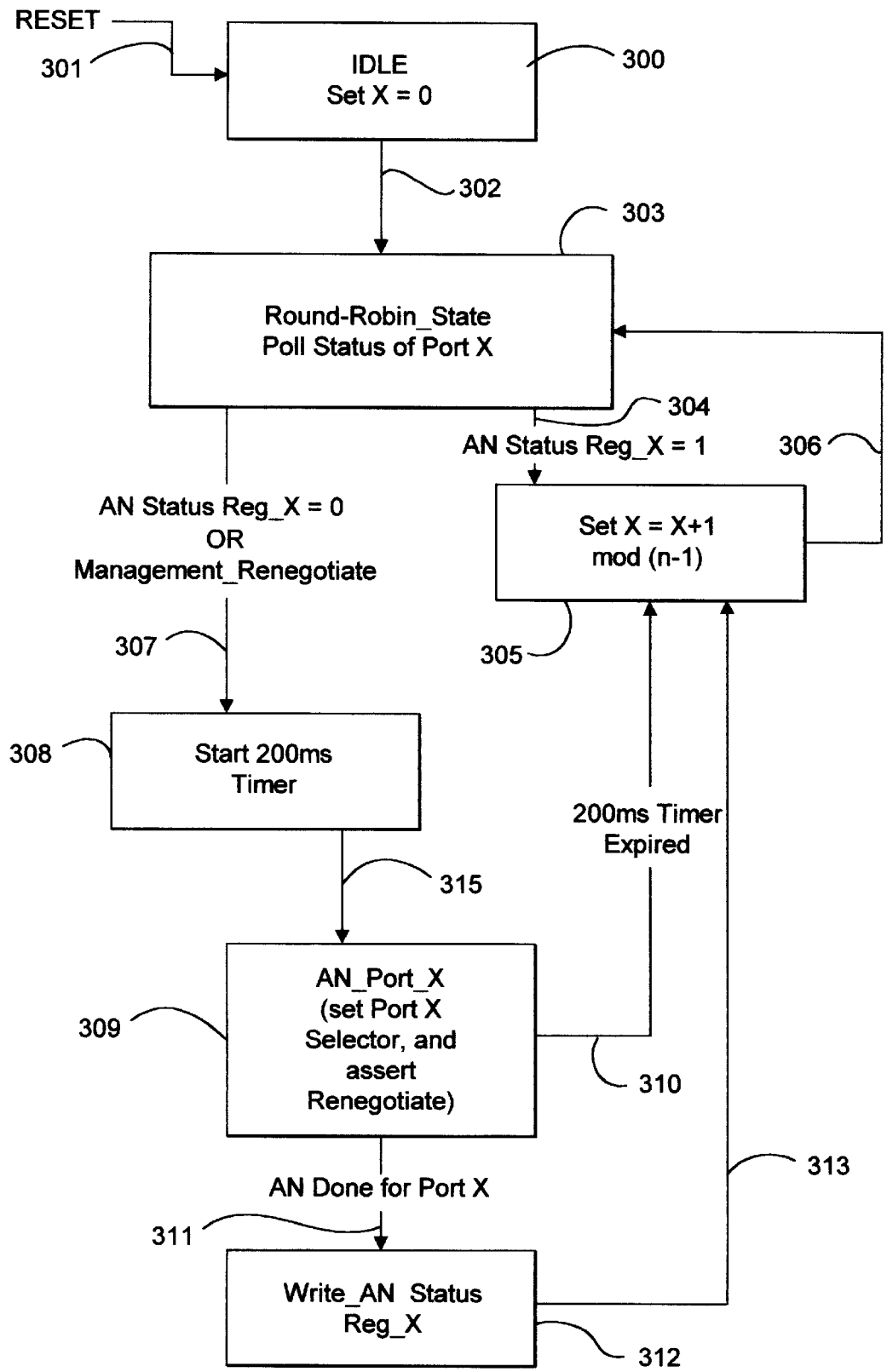
FIG. 3 is a state diagram illustrating operation of the master state machine of FIG. 2.

FIG. 3 illustrates in more detail, the operation of the master state machine 206 in FIG. 2. The master state machine includes an idle state 300, in which a port selector parameter X is set to 0. The idle state 300 is entered by assertion of the RESET signal as indicated by line 301. From the idle state, the state machine transitions on line 302 to a round robin state 303. In state 303, the status of port X is polled. If the status is resolved, indicated by a logic 1 stored in the corresponding status register, then the state machine transitions on line 304 to state 305, where the parameter X is incremented, modulo n−1. After the parameter X is incremented, the algorithm loops back to the round robin state 303 to test the next port so that the ports are polled in a round robin fashion. Other polling sequences may also be used, including priority based sequences or user specified sequences as suit a particular environment.

If in state 303, the corresponding status register indicates that the port is in an unresolved state, corresponding to a logic 0 in the corresponding register, or if a management renegotiate signal is received for port X, then the algorithm transitions on line 307 to state 308 where a 200 millisecond timer is started. Of course the length of the timer is determined according to a number of factors such as auto-negotiation protocol used, and can be optimized to meet a particular situation.

Next, the algorithm transitions from state 308 to the autonegotiate state 309, where the port X selector signal on line 207 is set to select port x, and the RENEGOTIATE signal is asserted on line 212. At state 309, the algorithm transitions on line 310 back to the increment state 305, if the timer expires before auto-negotiation is completed.

If the DONE signal is received from line 209 before the timer expires, then the master state machine transitions on line 311 to state 312, where the status register for the corresponding port is written with a resolved status signal, corresponding to a logic 1 in this example. After writing status, then the algorithm transitions on line 313 back to the state 305 to increment the parameter X.

Thus, initially, when the master state machine transitions from the idle to the round robin states, the port selector is set to port 0. The selector gets incremented one by one until it reaches n−1, for a total of n ports. X can also be set by the management entity, if the latter needs to renegotiate on a certain port. A timer, in this example, 200 milliseconds starts for port X, when the master state machine enters the state 309 to autonegotiate for port X. The timer gets reset upon entering the round robin state 303. The timer serves as a "move to next port" indicator, if the mode of operation of the port cannot be successfully renegotiated.

Figure 4:
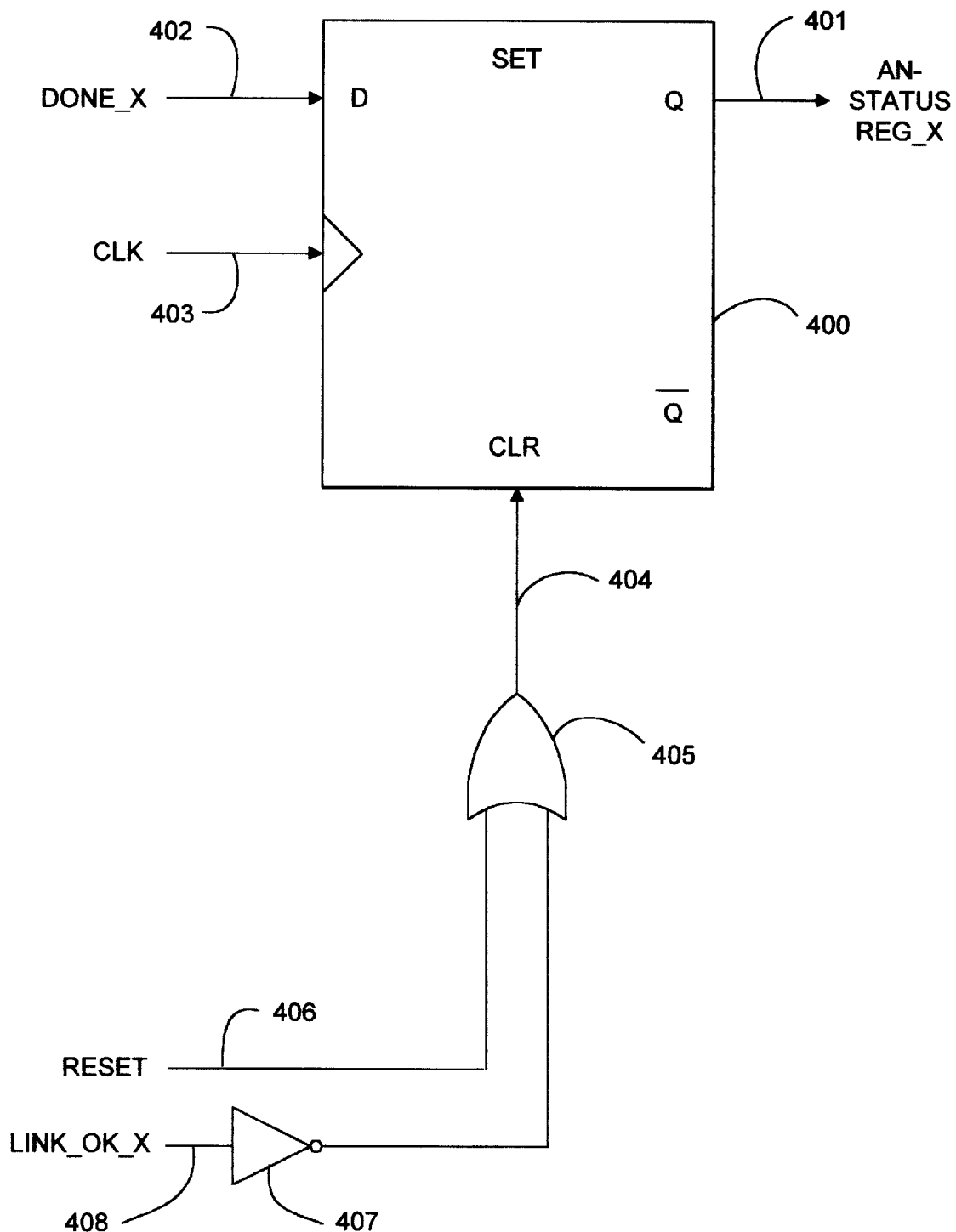
FIG. 4 is a simplified diagram of an auto-negotiation status register for use in the system of FIG. 2.

FIG. 4 illustrates the auto-negotiation status register for an individual port, used as a memory 213 in system of FIG. 2. Thus, a D-type register 400 in this example, stores an auto-negotiation status signal AN STATUS REG_X and outputs the status signal on line 401. The D input for the register 401 is supplied on line 402, from the DONE line 209 of FIG. 2. The clock signal 403 clocks the register 400 with appropriate timing under control of the state machine. The register 400 is reset by a signal on line 404. The signal on line 404 is supplied at the output of OR gate 405. The inputs to OR gate 405 include the RESET signal 406 which corresponds to the RESET signal 301 in FIG. 3 (also the RESET signal 211 in FIG. 2). The other input to the OR gate 405 comprises the output of inverter 407. The input to the inverter 407 is the LINK_OK_X signal on line 408. This signal corresponds to the LINK_OK signal on the line 208 of FIG. 2, for a selected port X. Thus, the register 400 is cleared at power on reset, or when the LINK_OK signal for port X is at logic 0, indicating that the link is down. The register is written by the master state machine when the port has been successfully autonegotiated as indicated by the DONE signal on line 402.

In conclusion, the present invention provides for the use of shared auto-negotiation state machine on a network intermediate device. A master state machine arbitrates among the ports on the device for use of the shared auto-negotiation state machine. The invention is applicable to any network device which has multiple ports, such as repeaters, bridges and switches. According to the present invention, substantial savings in integrated circuit complexity are made, without compromising functionality of the device, because it is unnecessary that auto-negotiation state machines operate in parallel on a multiple ports in a single device. Rather, a shared auto-negotiation state machine can effectively serve many ports in a single network intermediate device.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A device which interconnects across links a plurality of terminals having respective modes of operation, comprising:

a plurality of ports for connection to respective links;

logic coupled to the plurality of ports to exercise a protocol with terminals coupled the respective links to resolve modes of operation for the respective links, the logic including a shared unit for executing the protocol, and an arbiter unit for arbitrating among the plurality of ports for use of the shared unit, wherein the arbiter unit includes:

memory storing a set of status signals, status signals in the set indicating states of corresponding ports in the plurality of ports, wherein the states indicate whether a mode of operation of a corresponding port is resolved or unresolved, and logic which polls the memory to read the set of status signals in a sequence, and in response to status signals in the set, enables use of the shared unit by the corresponding ports, wherein if a status signal indicates that a mode of operation of a port is unresolved, the logic causes the corresponding port to connect to the shared unit and changes the status signal from unresolved to resolved.

2. The device of claim 1, wherein the arbiter unit comprises logic to connect ports in the plurality of ports to the shared unit in a round robin sequence.

3. The device of claim 1, wherein the logic comprises:

a selector responsive to the arbiter unit, having a plurality of inputs coupled to corresponding ports in the plurality of ports, and having an output coupled to the shared unit.

4. The device of claim 1, wherein status signals in the set indicate one of a resolved state and an unresolved state, the resolved state indicating that a mode of operation has been resolved for the link on the corresponding port, and the unresolved state indicating that a mode of operation has been not resolved for the link on the corresponding port.

5. The device of claim 4, wherein the shared unit generates a signal upon successful resolution of a mode of operation for a corresponding port, and including logic responsive to said signal to write status signals in the set to the memory.

6. The device of claim 1, wherein the modes of operation resolved by the shared unit include local area network LAN technologies supported by terminals on the corresponding links.

7. The device of claim 1, wherein the modes of operation resolved by the shared unit include IEEE 802.3 local area network LAN technologies supported by terminals on the corresponding links.

8. The device of claim 1, wherein the protocol executed by the shared unit comprises an auto-negotiation function specified according to IEEE Standard 802.3.

9. A method for automatically negotiating a mode of operation for a set of ports on a network device, comprising:

monitoring status of ports in the set of ports according to a sequence to determine whether a mode of operation is resolved or unresolved for selected ports in the sequence;

for a selected port in the sequence, if the status indicates that a mode of operation is unresolved, then connecting the selected port to a shared auto-negotiation unit and executing an auto-negotiation protocol for the selected port to resolve a mode of operation for the selected port; and changing the status of the selected port from unresolved to resolved, and returning to the step of monitoring.

10. The method of claim 9, including:

storing status signals in memory for the set of ports indicating for ports in the set whether a mode of operation is resolved or unresolved; and wherein the step of monitoring includes polling the stored status signals.

11. The method of claim 9, including:

storing status signals in memory for the set of ports indicating for ports in the set whether a mode of operation is resolved or unresolved; and wherein the step of monitoring includes polling the stored status signals according to a round robin sequence.

12. The method of claim 10, including generating a signal upon successful resolution of a mode of operation for the selected port, and writing in response to said signal the status signals in the set to memory.

13. The method of claim 9, wherein the modes of operation resolved by the shared auto-negotiation unit include local area network LAN technologies.

14. The method of claim 9, wherein the modes of operation resolved by the shared auto-negotiation unit include IEEE 802.3 local area network LAN technologies.

15. The method of claim 9, wherein the auto-negotiation protocol executed by the shared auto-negotiation unit comprises an auto-negotiation function specified according to IEEE Standard 802.3.

* * * * *